Aug. 12, 1969   M. Z. BAUMGARTEN   3,460,427
RETAINING RING
Filed Aug. 3, 1967
2 Sheets-Sheet 1
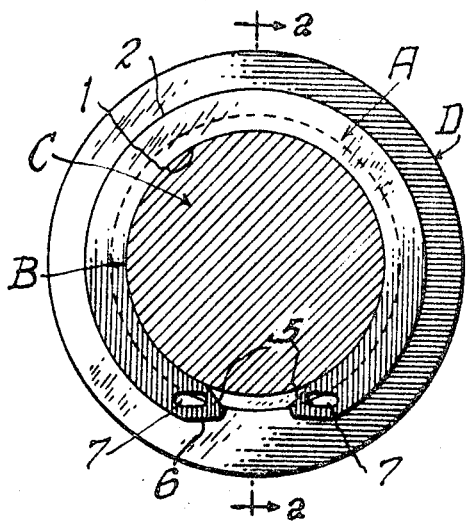
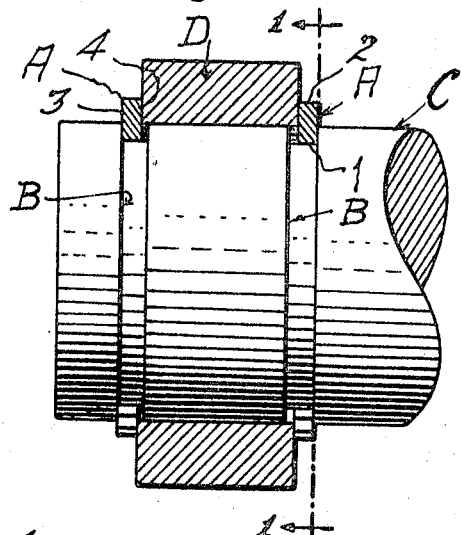
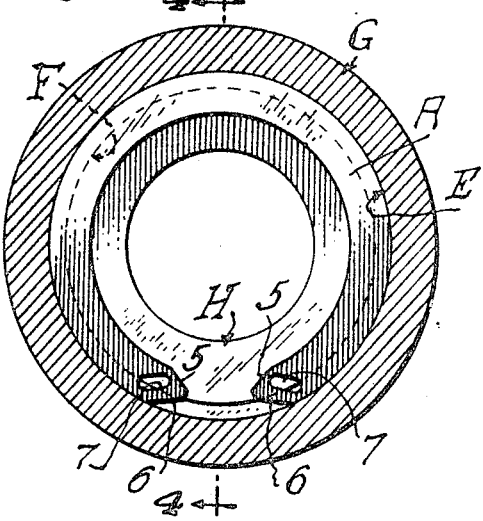
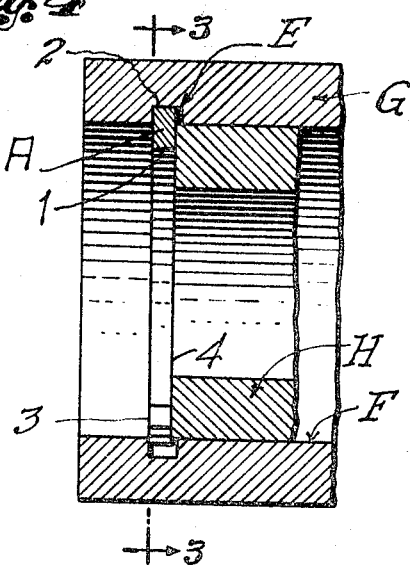
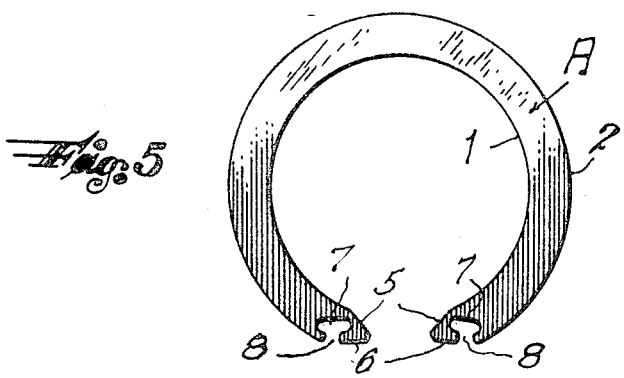
INVENTOR.
Morton Z. Baumgarten
BY
Harry B. Cook,
ATTORNEY

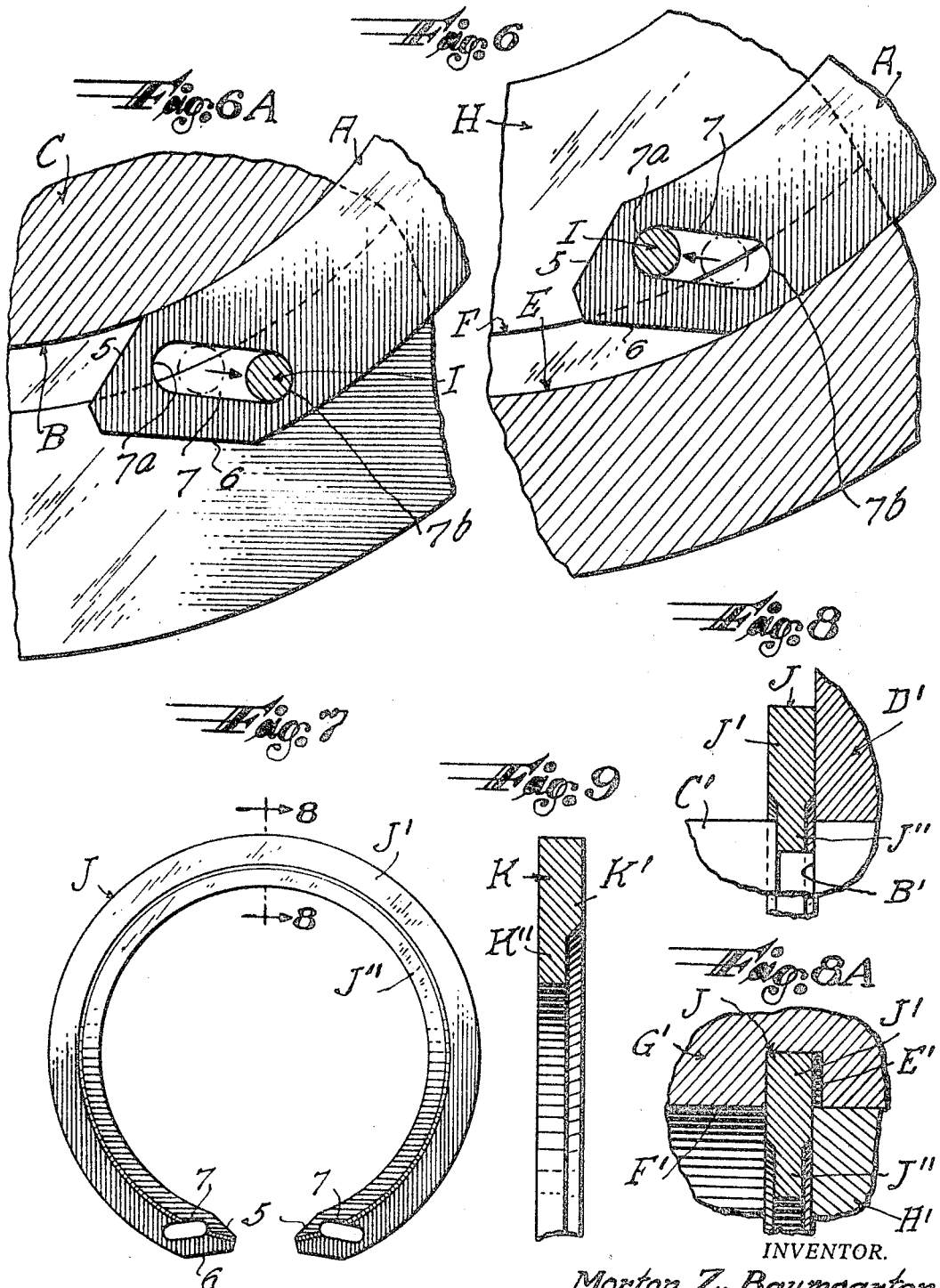

United States Patent Office 3,460,427
Patented Aug. 12, 1969

3,460,427
RETAINING RING
Morton Z. Baumgarten, Elizabeth, N.J., assignor, by mesne assignments, to Charter Wire, Inc., a corporation of Wisconsin
Filed Aug. 3, 1967, Ser. No. 658,228
Int. Cl. F16b 21/06
U.S. Cl. 85—8.8                            3 Claims

ABSTRACT OF THE DISCLOSURE

A split spring ring formed of drawn flat wire, has its inner and outer peripheries concentric and is of oblong rectangular cross-section throughout its periphery and has beveled ends providing for use of the ring either in an outside groove of a shaft or an inside groove in a housing with a minimum of distortion, for holding machine parts, for example gears, bearing races and pulleys, against axial displacement on the shaft or in the housing, and the ring has slots adjacent its ends oblique to said peripheries to coact with the fingers of tools to spread or contract the ring when it is used in an outside groove or an inside groove, respectively.

BACKGROUND OF THE INVENTION

Split spring retaining rings having a radial width or cross-sectional area which decreases progressively from the middle portion to the free ends are old as shown for example in Reissue Patent No. 18,144 and No. 2,509,081, but such rings are difficult to manufacture and are expensive, and different rings are required for innner and outer grooves, respectively. A primary advantage of such rings is their ability to maintain almost true circular shape when deflected that is, compressed or expanded during insertion into and removal from grooves, so that the extent to which such a ring must be deflected and the amount of deflection which remains when the ring is seated in the groove, is of little consequence.

Retaining rings having concentric inner and outer peripheries are known for use in either inside or outside grooves, for example as shown by German Patent 829,-971; but such rings are difficult to deflect, i.e. spread or contract without distortion of the ring during insertion into or removal from the grooves with which they are associated. Rings of this type when expanded or contracted, deviate from a true circular shape and become more or less elliptical depending upon the amount of deflection, so that the amount of deflection necessary for installation or removal of a ring of this type and the amount of deflection which still exists when the ring is seated in the groove, are important to ensure that the periphery of the ring snugly and uniformly contacts the bottom of the groove in which the ring is fitted.

The ring of German Patent 829,971 also embodies a projection at each end of the ring extending from one face of the ring which make manufacture and use of the ring difficult.

SUMMARY

The present invention contemplates a split spring retaining ring so constructed as to minimize the amount of deflection (expansion or contraction) for installation and more importantly to ensure the proper amount of deflection which still exists in the ring when the ring is seated in the groove so that the periphery of the ring will snugly contact or "hug" the bottom surface of the groove, and more particularly the invention contemplates such a split ring which has inner and outer beveled surfaces at each end and wherein the normal or free diameters of the inside and outside peripheries are close to the diameters of their respective grooves and said inside and outside diameters are concentric so that the ring shall be capable of use in either an outside groove in a shaft or an inside groove in the bore of a housing with a minimum of compression or expansion of the ring, and at least portions of the opposite faces of the ring are smooth and parallel to each other throughout the length of the ring between its ends with no projections from either face. The invention also provides a ring of this character having slots adjacent its ends oblique to the ring peripheries to coact with the points or fingers of tools for either expanding or contracting the ring without interference with the operation of the tool by either the shaft or the housing.

A BRIEF DESCRIPTION OF THE DRAWINGS

FIGURE 1 is a transverse vertical sectional view approximately on the plane of the line 1—1 of FIGURE 2;

FIGURE 2 is a vertical longitudinal sectional view through a part mounted on a shaft which is shown in side elevation, and two retaining rings embodying the invention, taken approximately on the plane of the line 2—2 of FIGURE 1;

FIGURE 3 is a view similar to FIGURE 1 showing an assembly of a retaining ring embodying the invention, a housing, and a part journaled in the housing, taken approximately on the plane of the line 3—3 of FIGURE 4;

FIGURE 4 is a vertical longitudinal sectional view on the plane of the line 4—4 of FIGURE 3; and FIGURE 5 is a plan view of a retaining ring embodying a modification of the invention;

FIGURE 6 is a fragmentary schematic composite sectional and elevational view illustrating the manner of compressing the ring for insertion into or removal from a housing groove;

FIGURE 6A is a similar view showing the expansion of a ring for insertion into a shaft groove;

FIGURE 7 is a plan view similar to FIGURE 5 showing a modification of the invention;

FIGURE 8 is an enlarged transverse sectional view through the ring approximately on the plane of the line 8—8 of FIGURE 7 and showing the ring in the external groove of a shaft which is illustrated in broken lines;

FIGURE 8A is a similar view showing the ring in an internal groove in a housing which is illustrated in broken lines, and FIGURE 9 is a transverse sectional view of a ring embodying a modification of the construction shown in FIGURES 7 and 8.

A BRIEF DESCRIPTION OF THE PREFERRED EMBODIMENTS

Referring first to FIGURES 1 and 2, there are shown two retaining rings A embodying the invention each seated in a circumferential outwardly opening or outside groove B formed in the periphery of a shaft C at opposite sides of a part D, such as a bearing race ring or a gear to be held against axial displacement on the shaft.

FIGURES 3 and 4 show the ring A embodying the invention seated in an inwardly opening or interior groove E in the bore F of a housing G, the ring being shown as disposed at one end of a machine part H to be held against axial displacement.

The ring A is a split spring ring preferably formed of drawn flat wire having concentric inner and outer peripheries 1 and 2, respectively, throughout, and flat smooth parallel surfaces 3 and 4. As shown in FIGURES 1 to 5, the ring is of uniform oblong rectangular cross-section throughout the major portion of its length, that is, to points close to the ends of the ring. The end portions or extremities of the ring have inner and outer beveled surfaces 5 and 6, respectively, which provide clearance between the end portions of the ring and the shaft or housing during installation of the ring, and thereby minimize the extent of expansion or compression of the ring required for inserting the ring over a shaft or into a housing. This is important to the end that there shall be a minimum of deviation from a true circle of the inner and outer peripheral surfaces of the ring; and the further minimizing of the expansion or compression required for installation, is achieved by making the inner and outer diameters close to the respective groove diameters which reduces to the minimum the deflection which still exists when the ring is seated in the groove. Due to the greater stiffness of this type of ring, as compared with the ring of non-uniform cross-sectional area, this small amount of deflection provides as much, if not more, "groove-hugging" force as does the relatively large amount of deflection which still exists in the second-mentioned ring when said ring is seated in the groove.

Adjacent each end of the ring is an opening 7 into which may be inserted the point or finger I of a tool for expanding or contracting the ring to permit its insertion into or withdrawal from a groove in either a shaft or a housing. Preferably, as shown best in FIGURES 6 and 6A of the drawings the openings are elongated or in the form of slots disposed obliquely to the inner and outer peripheral surfaces of the ring and being of such length that one end of or the other of each slot will be clear of the shaft or the housing, respectively, when the ring is seated in its groove. Referring particularly to FIGURE 6 where the ring is shown as seated in the internal groove E in the housing G, one end 7a of the slot 7 is clear of the interior surface of the bore F so that the tool fingers can be freely inserted into said ends of the slots for compressing or contracting the ring out of the groove E. It will be noted that regardless of where the fingers I of the tool are inserted in the slot, for example as indicated by the broken lines in FIGURE 6, the direction of the force they exert for contraction of the ring will push the fingers into the innermost ends 7a of the slots and clear of the inner surface of the bore F.

Now referring to FIGURE 6A which shows the ring in an exterior groove B in a shaft C, the fingers I of the tool are disposed at the other ends 7b of the slots and clear of the shaft when the ring is to be expanded out of the groove, and regardless of where the fingers are initially inserted into the slots, for example as indicated by broken lines, the movement of the fingers in the direction to exert the force necessary to expand the ring will push the fingers into said ends 7b of the slots.

It will be understood that the same relationships of the fingers of the tool and the slots will occur whether or not the rings are being inserted into or removed from their respective grooves.

In many instances in general known practice the external grooves and internal grooves are of different widths and in providing one ring to serve in either an external groove or an internal groove in accordance with my invention it is desirable to provide the ring with two different thicknesses, that is, one thickness for the internal portion of the ring and a second thickness for the external or outer portion of the ring as shown in FIGURES 7, 8, 8A and 9. FIGURES 7, 8 and 8A show a ring J having its outer circumferential portion J' of greater thickness than its inner circumferential portion J". In FIGURE 8 the ring is shown with its inner portion J" seated in an external groove B' in a shaft C' for holding the part D' on the shaft. In FIGURE 8A the ring is shown with its outer portion seated in an interior groove E' in the bore F' of a housing G' for holding the part H' in the bore of the housing.

The ring J has the inner and outer portions symmetrically arranged with respect to each other with the thicker portion J' projecting equidistantly from opposite sides of the inner portion J", but in some instances it may be desirable to have the outer portion project beyond only one side of the inner portion as exemplified by the ring K shown in FIGURE 9.

As an alternate method of manufacture, in some instances it may be desirable to provide a slot 8 extending inwardly from a beveled surface 6 into each slot 7 as shown in FIGURE 5.

It will thus be seen that the invention provides a construction wherein the interior diameter of the ring adapts the ring for use with an outside groove in a shaft, while the outer diameter adapts the ring for use in an interior groove in a housing. Therefore, the same ring may be kept in stock for use in either an outside groove of a certain diameter or an inside groove of a certain diameter. Thus the ring of the invention will take the place of two known types of rings, one for an outside groove and another for an inside groove. The inner peripheral surface snugly seats on the bottom of the outwardly facing groove, while the outer peripheral surface seats on the bottom of the inwardly facing groove. The ring is simple and inexpensive to manufacture and can be used with a minimum of difficulty by even relatively unskilled persons.

Furthermore the beveled ends of the ring provide against excessive deviation from a true circle or excessive distortion of the inner or outer peripheral surfaces of the ring and ensure adequate "groove-hugging" force when the ring is installed in the groove. The oblique slots provide for easy manipulation by a ring-handling tool during both the insertion and removal of the ring into and from a groove.

I claim:

1. A retaining ring adapted to serve in either an outwardly opening groove of a certain diameter in a shaft or an inwardly opening groove of a certain diameter in a housing to hold a machine part against axial displacement relative to the shaft or housing, said ring comprising a one-piece split spring ring having opposite smooth parallel face portions and concentric inner and outer peripheral surfaces having diameters to seat in said outwardly opening groove and in said inwardly opening groove, respectively, the ends of the ring being spaced apart and each end portion having an opening to receive the working finger of a ring-handling tool, the ring further consisting of two peripheral sections of different thicknesses with the section of lesser thickness lying entirely within the axial boundaries of the thicker section, each of said sections being of uniform thickness and of uniform radial extent throughout substantially the entire peripheral extent thereof, said sections extending inwardly from the outer and inner peripheral surfaces of the ring for insertion into grooves of different widths, each of said finger-receiving openings comprising an elongated slot obliquely disposed to said peripheral surfaces and of a length providing for free exposure of the outer end of the slot for insertion of the tool finger when the ring is inserted into an outwardly opening groove and for free exposure of the inner end of the slot for insertion of the tool finger when the ring is inserted into an inwardly opening groove.

2. A retaining ring according to claim 1, in which said split ring has inner and outer beveled surfaces at each of its end portions.

3. A retaining ring according to claim 1, in which each of said ring sections of different thicknesses is oblong rectangular in cross-section.

References Cited

UNITED STATES PATENTS

| | | | |
|---|---|---|---|
| 2,487,803 | 11/1949 | Heimann | 85—8.8 |
| 2,883,899 | 4/1959 | Bluth | 85—8.8 |
| 3,104,905 | 9/1963 | Erdmann et al. | 85—8.8 |
| 3,180,388 | 4/1965 | Newcomer et al. | 151—69 |

FOREIGN PATENTS 864,376  1/1941  France.

RAMON S. BRITTS, Primary Examiner

U.S. Cl. X.R.

287—52